(12) United States Patent
Iwata

(10) Patent No.: US 8,509,771 B2
(45) Date of Patent: Aug. 13, 2013

(54) BASE STATION AND CONTROL METHOD OF BASE STATION

(75) Inventor: Kei Iwata, Kanagawa (JP)

(73) Assignee: Kyocera Corporation (JP)

( * ) Notice: Subject to any disclaimer, the term of this patent is extended or adjusted under 35 U.S.C. 154(b) by 0 days.

(21) Appl. No.: 13/202,749

(22) PCT Filed: Feb. 25, 2010

(86) PCT No.: PCT/JP2010/001276
§ 371 (c)(1),
(2), (4) Date: Aug. 22, 2011

(87) PCT Pub. No.: WO2010/098104
PCT Pub. Date: Sep. 2, 2010

(65) Prior Publication Data
US 2011/0300863 A1    Dec. 8, 2011

(30) Foreign Application Priority Data
Feb. 25, 2009    (JP) .................................. 2009-043032

(51) Int. Cl.
*H04W 4/00*    (2009.01)
(52) U.S. Cl.
USPC ........ 455/435.1; 455/434; 455/436; 370/328; 370/338
(58) Field of Classification Search
USPC ............... 455/435.1, 434, 436; 370/328, 338
See application file for complete search history.

(56) References Cited

U.S. PATENT DOCUMENTS

| | | | |
|---|---|---|---|
| 7,944,867 B2 | 5/2011 | Usuba | |
| 2009/0040954 A1 | 2/2009 | Usuba | |
| 2010/0054219 A1* | 3/2010 | Humblet et al. | 370/338 |
| 2010/0157891 A1* | 6/2010 | Mikan et al. | 370/328 |

FOREIGN PATENT DOCUMENTS

| | | |
|---|---|---|
| JP | 2003-087840 A | 3/2003 |
| JP | 2003-348104 A | 12/2003 |
| JP | 2009-033476 A | 2/2009 |
| JP | 2010-109641 A | 5/2010 |
| KR | 2000-0060784 A | 10/2000 |
| WO | 2006/088135 A1 | 8/2006 |

OTHER PUBLICATIONS

International Search Report; PCT/JP2010/001276; May 25, 2010.
U.S. Appl. No. 13/121,403, filed Mar. 28, 2011; First named inventor Kei Iwata.

(Continued)

*Primary Examiner* — Patrick Edouard
*Assistant Examiner* — Julio Perez
(74) *Attorney, Agent, or Firm* — Studebaker & Brackett PC

(57) ABSTRACT

Provided is a base station which uses a pilot beacon to prompt a terminal to perform handoff from a macrocell and is capable of avoiding interference with the macrocell. A base station (FAP) of a mobile communication system has a transmission unit (122) for transmitting a pilot beacon to allow a mobile terminal to detect the base station, a registration unit (141) for registering information on a mobile terminal to use the base station or information on a user corresponding to the mobile terminal, and a control unit (110) for controlling a transmission unit (122) to stop transmission of the pilot beacon if a mobile terminal corresponding to the information registered with the registration unit (141) performs handoff to the base station.

3 Claims, 9 Drawing Sheets

(56) References Cited

OTHER PUBLICATIONS

Korean Office Action "Notice of Grounds for Rejection" dated Oct. 11, 2012, which corresponds to Korean Patent Application No. 10-2011-7019522 and is related to U.S. Appl. No. 13/202,749 with translation.

The Final Office Action issued from the United States Patent and Trademark Office on Mar. 19, 2013, which corresponds to U.S. Appl. No. 13/121,403 and is related to U.S. Appl. No. 13/202,749.

* cited by examiner

BASE STATION AND CONTROL METHOD OF BASE STATION

CROSS REFERENCE TO RELATED APPLICATION

This application claims priority to and the benefit of Japanese Patent Application No. 2009-043032 filed on Feb. 25, 2009, the entire contents of which are incorporated herein by reference.

TECHNICAL FIELD

The present invention relates to base stations and control methods of base stations, and more particularly, to base stations (femtocell) for connecting to a mobile communication network via a public link and the control methods of the base stations.

BACKGROUND ART

In a mobile communication system, there has recently been suggested a scheme of a base station called femtocell (femtocell FAP) which covers a very small area compared to a conventional base station (wide area base station, macrocell). The femtocell is a small base station installed in a house, a small office and the like, for example. While a conventional cell of a mobile phone, that is, an area covered by a single wide area base station is about 1 to several kilometers in radius, the area covered by the femtocell is only about a few to tens of meters. The femtocell is connected to the mobile communication network via a public link (broadband link such as ADSL or the like) installed in each house. Since the public link is widely distributed as an access link, a user even outside the area of the macrocell can easily use mobile phone services (a telephone call, a message function, an SMS (Short Message Service), a WEB browsing function and the like) similar to those provided by the macrocell at low cost if the broadband link is available. In addition, there is an advantage for a carrier as well, that use of the femtocell and the broadband link by the user saves resources (bandwidth or the like) of an existing wide area base station, supposed to be consumed, allowing for an improvement in the area of mobile phones at low cost.

Therefore, it is expected that in 3 Generation (3G), 3.9 Generation (3.9G) and IMT-ADVANCED using a frequency band at 2 GHz or higher frequency, it becomes essential to combine the wide area base station installed outdoors and the femtocell installed indoors. In addition, since it is considered preferable to allow only registered terminals (mobile terminals) to use the femtocell, the femtocell can be configured to be occupied by only a limited number of users registered to use. Accordingly, the femtocell has an advantage to offer a faster data communication environment of better quality than the macrocell overcrowded with communications of multiple users, and thus it is expected to come into wide use in the future.

Because of the advantages of the femtocell described above, it is expected that a user capable of using a femtocell service wishes to connect to the femtocell when he enters the femtocell network from the macrocell network. As a method of handoff from the macrocell to the femtocell, it is considered to use a pilot beacon. Although it is desired that the femtocell uses a frequency different from that used by the macrocell in to avoid interference with the macrocell, it is preferred to transmit the pilot beacon at the same frequency as that of the macrocell to attract the terminal communicating with the macrocell to the femtocell. In this case, there is a problem that the pilot beacon interferes with the macrocell.

As a countermeasure against such a problem, there has been suggested a technique to stop transmission of a beacon frame if there is no radio station terminal in a wireless area of an access point of a wireless LAN, in order to prevent a negative effect on other systems using the same frequency (for example, see Patent Document 1). In addition, there has been also suggested another technique that a base station adjusts transmission power based on a location of a terminal (for example, see Patent Document 2).

PRIOR ART DOCUMENTS

Patent Documents

Patent Document 1: JP 2003-348104 A
Patent Document 2: JP 2003-087840 A

SUMMARY OF INVENTION

Technical Problem

For the following reasons, only limited terminals are allowed to connect to the femtocell. First, since a network from the femtocell to the mobile communication network uses a leased link (femtocell user subscription link) subscribed by the user, it is a problem to allow for connection of any terminal, in terms of contracts and security. Moreover, the carrier (communication carrier) providing the femtocell service may not permit connections of unspecified terminals because of the necessity for access control.

Accordingly, it is assumed that the femtocell allows only terminals (registered terminals) registered therewith as permitted terminals. In this case, since the femtocell is often installed in a house, an office and the like, it may happen that there is no registered terminal in the service area of the femtocell or all of the registered terminals are in the area. Although the femtocell needs to transmit the pilot beacon in the former condition, it does not need to transmit the pilot beacon in the latter condition because all of the registered terminals are already in the idle state in the femtocell and thus no more terminals will request handoff to the femtocell. In order to prevent unnecessary interference with the macrocell, it should refrain from transmitting the pilot beacon as much as possible. Therefore, it is not desirable to transmit the pilot beacon in the latter condition. In addition, even in the former condition, the registered terminal may be too far from the area of the femtocell to receive the pilot beacon. In this case also, it is not desired to transmit the pilot beacon which can interfere with the macrocell.

Although Patent Document 1 suggests a method to improve the former condition, it does not consider the latter condition. That is, there is no disclosure about limit of transmission of the pilot beacon when there are registered terminals in the area of the base station in Patent Document 1. In addition, Patent Document 2 neither discloses nor suggests that a base station stops transmission of radio waves. The method disclosed in Patent Document 2 cannot solve the problem in the latter condition.

Accordingly, it is an object of the present invention to provide a base station (femtocell), which uses the pilot beacon for handoff from the macrocell to the base station, capable of avoiding interference with the macrocell by transmitting the pilot beacon only when a registered terminal is in or close to its communication area and by stopping transmission of the pilot beacon in other cases and in a case that all of registered terminals are already in the idle state.

Solution to Problem

In order to solve the above problems, a base station of a mobile communication system (base station (femtocell) connected to a mobile communication network via a public link (broadband link such as ADSL or the like)) according to the present invention includes:

a transmission unit (radio communication unit) for transmitting a pilot beacon to allow a mobile terminal to detect the base station;

a registration unit (for example, a memory unit for storing such information) for registering information on a (at least one) mobile terminal to use the base station or information on a user corresponding to the mobile terminal; and a control unit (transmission control unit) for controlling the transmission unit to stop transmission of the pilot beacon if a terminal corresponding to the information registered with the registration unit performs handoff (location registration) to the base station.

In addition, according to one embodiment of the present invention, the base station of the mobile communication system (base station (femtocell) connected to the mobile communication network via the public link (broadband link such as ADSL or the like)) further includes:

a reception unit (radio communication unit) for receiving a radio wave (of uplink communication) transmitted to another base station from a mobile terminal location-registered (a session established) with the another base station (macrocell) of the mobile communication system; and an obtaining unit (terminal information obtaining unit) for obtaining information on a mobile terminal location-registered (in communication) with the another base station or information on a user corresponding to the mobile terminal from a mobile communication network ((server on) a core network), to which the another base station is connected, wherein the control unit controls the obtaining unit to obtain information (ESN or the like) on a mobile terminal with intensity of the radio wave received by the reception unit equal to or higher than a threshold or information on a user corresponding to the mobile terminal based on an identifier (communication identifier UATI) included in the radio wave (with intensity equal to or higher than the threshold) while transmission of the pilot beacon is stopped, and if the mobile terminal corresponding to the information obtained is registered with the registration unit, controls the transmission unit to resume transmission of the pilot beacon.

In addition, according to another embodiment of the present invention, in the base station of the mobile communication system (base station (femtocell) connected to the mobile communication network via the public link (broadband link such as ADSL or the like)), the control unit controls the reception unit to stop reception of the radio wave if all of mobile terminals registered with the registration unit are location-registered with the base station based on information on the mobile terminals location-registered with the base station or information on users corresponding to the mobile terminals and also based on information on the mobile terminals registered with the registration unit or information on users corresponding to the mobile terminals.

Although apparatuses are described above as solutions according to the present invention, it should be understood that the present invention can also be implemented by methods, programs and storage media storing programs and that they are thus included in the scope of the present invention. Each step of methods and programs described below may use an arithmetic processing unit such as a CPU, a DSP or the like, as necessary, for processing data, and store input data and processed or generated data in a storage device such as an HDD, a memory or the like.

For example, as a method implementing the present invention, a control method of a base station of a mobile communication system includes the steps of:

(wherein a base station has a transmission unit, a registration unit and a control unit;)

transmitting (by the transmission unit) a pilot beacon to allow a mobile terminal to detect the base station;

registering (by the registration unit) information on a mobile terminal to use the base station or information on a user corresponding to the mobile terminal; and stopping (by the control unit) transmission of the pilot beacon if the terminal corresponding to the information registered at the step of registering performs handoff to the base station.

DESCRIPTION OF EMBODIMENT

Embodiments of the present invention will be described with reference to the accompanying drawings. In the following description, it is assumed to use CDMA2000 1xEV-DO as a mobile communication system.

Figure 1:
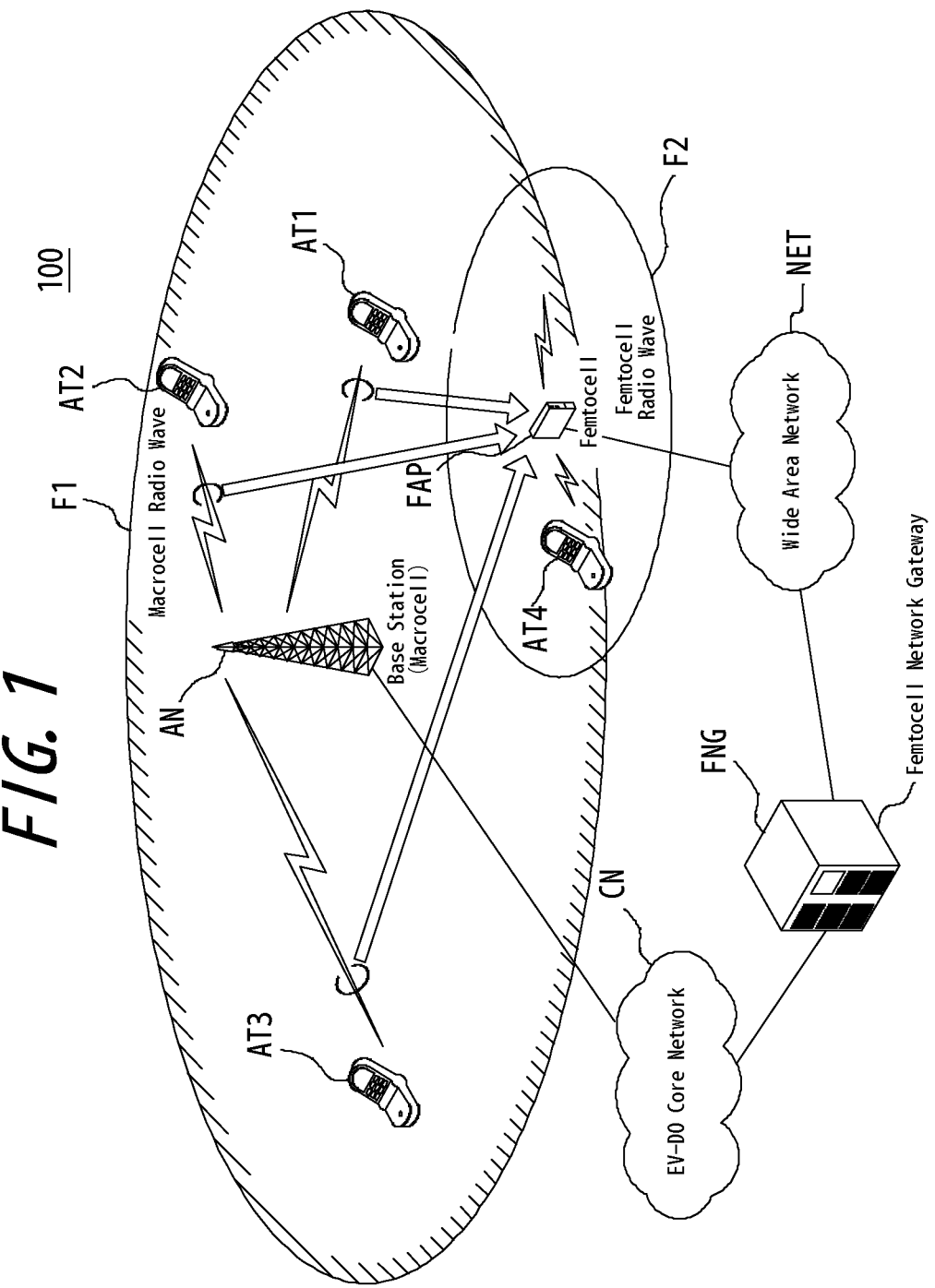
FIG. 1 is a schematic configuration diagram illustrating a mobile communication system including a femtocell and a macrocell.

FIG. 1 is a schematic configuration diagram illustrating a mobile communication system including a femtocell and a macrocell. As shown in the figure, a mobile communication system 100 includes a base station (macrocell, access network) AN, an EV-DO core network CN, a femtocell network gateway FNG, a wide area network NET, a femtocell FAP, and a plurality of terminals (mobile terminals) AT1-AT4. The EV-DO core network CN constitutes a backbone portion of the mobile communication network including PDSN (Packet Data Serving Node), PCF (Packet Control Function) and the like (not shown). The femtocell network gateway FNG relays a connection between the wide area network NET and the EV-DO core network CN.

In the mobile communication system 100, the macrocell AN transmits macrocell radio waves at a frequency F1. The femtocell FAP can transmit a pilot beacon at the frequency F1, the same frequency as the macrocell radio wave, in order to attract a terminal in communication with the macrocell to the femtocell (to prompt handoff). The femtocell FAP uses femtocell radio waves at a frequency F2 for communication with a terminal.

Figure 2:
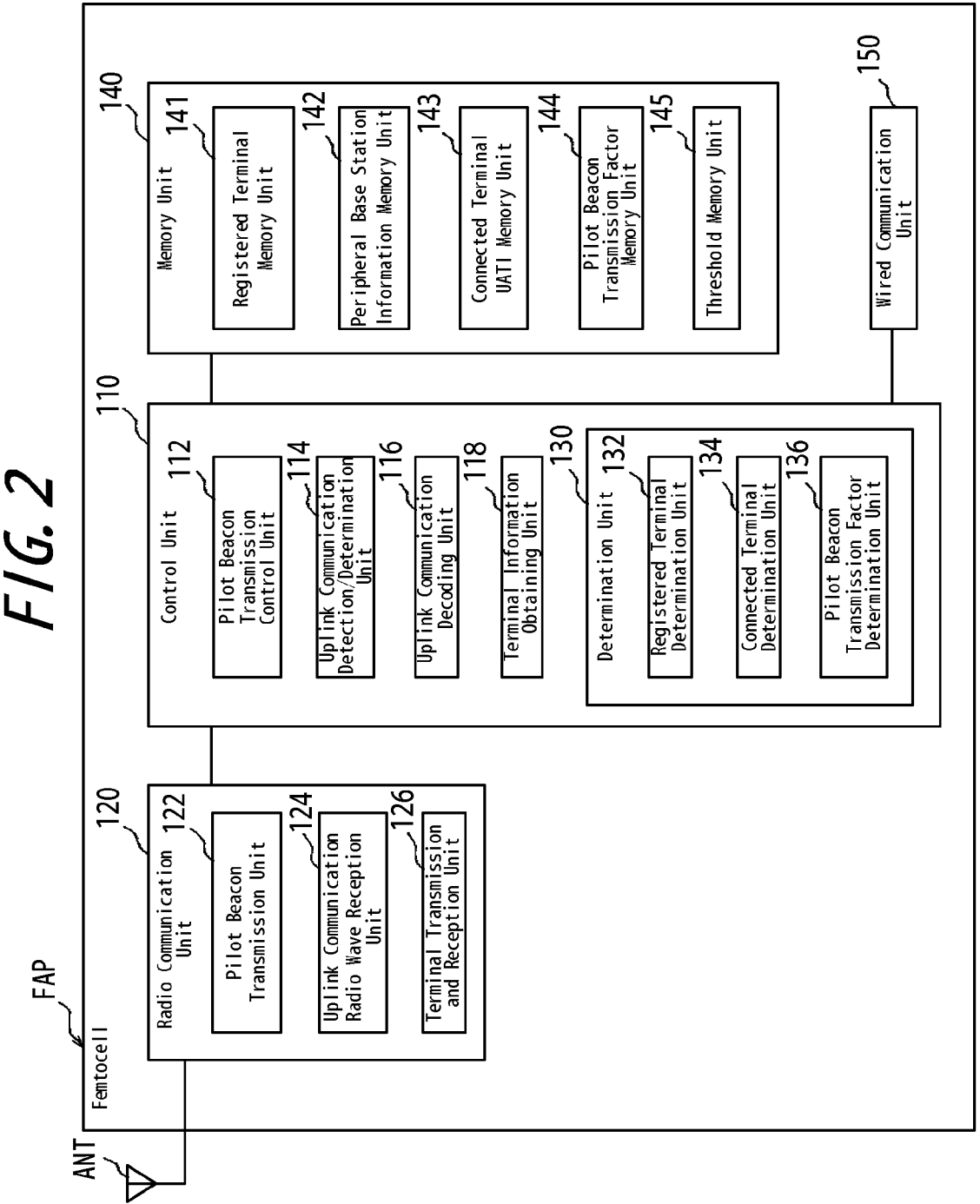
FIG. 2 is a schematic block diagram illustrating a femtocell FAP.

Next, the femtocell FAP will be described. FIG. 2 is a schematic block diagram illustrating the femtocell FAP. As shown in the figure, the femtocell FAP has an antenna ANT, a control unit 110, a radio communication unit 120, a memory unit 140 and a wired communication unit 150. The radio communication unit 120 has a pilot beacon transmission unit 122, an uplink communication radio wave reception unit 124 and a terminal transmission and reception unit 126. The terminal transmission and reception unit 126 transmits and receives radio waves for the communication with the terminal (mobile terminal) AT via the antenna ANT. The pilot beacon transmission unit 122 transmits the pilot beacon. The uplink communication radio wave reception unit 124 receives radio waves (of uplink communication) transmitted to the macrocell AN from a terminal (mobile terminal) location-registered (a session established) with the macrocell AN.

The control unit 110 is responsible for control of overall femtocell FAP and has a pilot beacon transmission control unit 112, an uplink communication detection/determination unit 114, an uplink communication decoding unit 116, a terminal information obtaining unit 118 and a determination unit 130. The pilot beacon transmission control unit 112 controls start and stop of transmission of the pilot beacon. The uplink communication detection/determination unit 114 detects and monitors the uplink communication radio waves received by the uplink communication radio wave reception unit 124 and determines whether intensity of the radio waves is equal to or higher than a threshold. The uplink communication decoding unit 116 decodes the uplink communication, which is determined by the uplink communication detection/determination unit 114 that the intensity of the uplink communication radio waves received by the uplink communication radio wave reception unit 124 is equal to or higher than the threshold, and extracts a UATI (Unicast Access Terminal Identifier) contained in the radio wave. The terminal information obtaining unit 118, based on the UATI extracted by the uplink communication decoding unit 116, obtains an ESN (Electric Serial Number) of a terminal assigned the UATI from the EV-DO core network CN (mobile communication network). The UATI and the ESN will be described later.

The determination unit 130 has a registered terminal determination unit 132, a connected terminal determination unit 134 and a pilot beacon transmission factor determination unit 136. The registered terminal determination unit 132 determines whether the ESN obtained by the terminal information obtaining unit 118 corresponds to an ESN of a terminal (registered terminal) registered to use the femtocell FAP (itself). The connected terminal determination unit 134 determines whether all of the registered terminals are location-registered with the femtocell FAP, that is, whether they have established sessions of idle/connection or the like. The pilot beacon transmission factor determination unit 136 determines whether the ESN of the registered terminal, which has performed handoff to the femtocell FAP, corresponds to the ESN of the terminal which was a factor causing transmission of the pilot beacon.

The memory unit 140 has a registered terminal memory unit 141, a peripheral base station information memory unit 142, a connected terminal UATI memory unit 143, a pilot beacon transmission factor memory unit 144 and a threshold memory unit 145. The registered terminal memory unit 141 registers information on the registered terminals or information on users (subscribers or users of the registered terminals) corresponding to the registered terminals. For example, the ESN can be used as the information on the terminal registered with the femtocell FAP. The ESN is a number (terminal identifier) unique to a terminal, and if the terminal is a mobile phone, the ESN can be calculated from its phone number or the like. In addition, the information on the users corresponding to the registered terminals may be information indicating users who subscribe with a carrier providing the femtocell FAP and allowed to use the femtocell FAP. If the user uses a plurality of terminals, it is favorable to use the latter information. The terminal identifier is not limited to the ESN but may be another identifier, so long as the femtocell can obtain it from the wide area network NET.

The peripheral base station information memory unit 142 stores information on a macrocell located on the periphery of the femtocell. This information includes information (Band Class, a channel, a PN (Pseudorandom Number) code and the like) necessary for monitoring communications of the terminal connecting to the macrocell AN, as well as information (Color Code, Sector ID and the like) necessary for decoding the uplink communication of the terminal. The connected terminal UATI memory unit 143 stores the UATI of a terminal which has established a session with the femtocell, that is, the UATI of a terminal in the idle state or in connection with the femtocell. The pilot beacon transmission factor memory unit 144 stores the ESN of the terminal which was a factor causing transmission of the pilot beacon. The threshold memory unit 145 stores the threshold of the intensity of the radio wave transmitted by the terminal connected to the macrocell AN. The wired communication unit 150 is connected to the wide area network NET such as the Internet via a router and a public link (broadband link such as ADSL or the like).

When the femtocell FAP is installed or moved and/or registers a terminal that uses itself, it stores the ESN and usable frequency of the registered terminal, and an ID number of the subscriber of the femtocell FAP in the registered terminal memory unit 141. Such information may be obtained from a direct input by the user with an operation input unit, such as a keyboard or the like (not shown) provided to the femtocell FAP. Alternatively, the terminal may wirelessly transmit the information to the femtocell FAP. Moreover, the femtocell FAP obtains information on the macrocell AN on the periphery thereof from a management server of a femtocell (not shown) in the EV-DO core network CN or obtains the information by monitoring the communication of the macrocell AN and stores it in the peripheral base station information memory unit 142.

Figure 3:
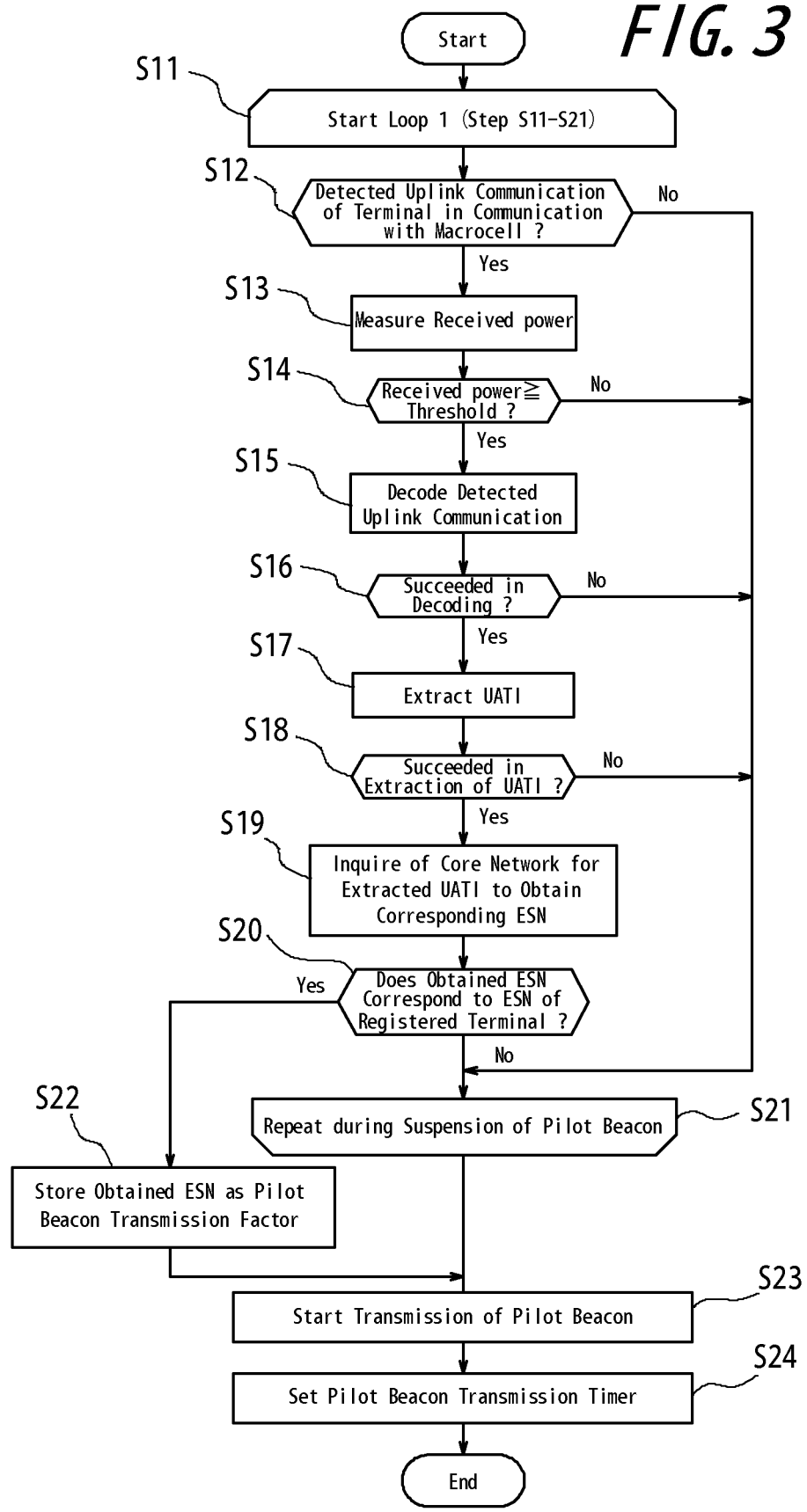
FIG. 3 is a flowchart of exemplary processing to start transmission of a pilot beacon by the femtocell FAP.

The following is a description of processing to start transmission of the pilot beacon by the femtocell FAP. FIG. 3 is a flowchart of exemplary processing to start transmission of the pilot beacon by the femtocell FAP. The femtocell FAP repeats a loop 1 (steps S11-S21) while transmission of the pilot beacon is stopped. First, using the information stored in the peripheral base station information memory unit 142 described above, the uplink communication detection/determination unit 114 detects an uplink communication between the macrocell AN and the terminal received by the uplink communication radio wave reception unit 124 (step S12). If the uplink communication is detected, the uplink communication detection/determination unit 114 measures received power thereof (step S13) and determines whether it is equal to or higher than the threshold stored in the threshold memory unit 145 (step S14). This threshold is set based on the following concept.

An object of the present invention is to reduce an effect on the macrocell AN by the pilot beacon transmitted from the femtocell FAP. Therefore, it is preferred to transmit the pilot beacon only when the registered terminal is located in or close to an area of the femtocell FAP. Here, for the communication between the macrocell AN and the terminal AT, in general, the transmission power of the terminal AT is controlled such that received power at the macrocell AN is virtually constant. That is, if the femtocell FAP measures a radio wave exceeding a certain level set by the macrocell AN, it can determine that the terminal transmitting the radio wave is closer to the femtocell FAP than the macrocell AN. Accordingly, the certain value set by the macrocell AN is employed as the threshold to be stored in the threshold memory unit 145. It is also possible to narrow or widen an area for determination that a terminal is close to the femtocell FAP, providing some margin from the certain value of the received power.

Referring now back to the flowchart in FIG. 3. If it is determined that the received power of the radio wave received by the uplink communication radio wave reception unit 124 is equal to or higher than the threshold at step S14, the uplink communication decoding unit 116 attempts to decode the uplink communication detected, by using the information on the macrocell AN stored in the peripheral base station information memory unit 142 (step S15). Next, if it is determined by the determination unit 130 that the uplink communication is successfully decoded at step S16, the uplink communication decoding unit 116 attempts to extract the UATI of the terminal AT in communication with the macrocell AN from a result of decoding (step S17). If it is determined by the determination unit 130 that the UATI is successfully extracted at step S18, the terminal information obtaining unit 118 obtains the ESN corresponding to the extracted UATI from the EV-DO core network CN via the wired communication unit 150 (step S19). Here, the UATI is an identifier temporarily provided by a base station to a terminal which connects to the base station (establishes a session with the base station). Therefore, the macrocell AN assigns the UATI to the terminal which request communication and associates the assigned UATI with the ESN or the like which is an identifier of the terminal. Information on the association between the UATI and the ESN is stored in PCF, PDSN and/or a server, connected to the macrocell AN, in the EV-DO core network CN. Accordingly, the terminal information obtaining unit 118 can obtain the ESN from the PCF or the PDSN connected to the macrocell AN by using the wired communication unit 150.

Next, the registered terminal determination unit 132 determines whether the information on the terminal corresponding to the ESN obtained from the EV-DO core network CN or the information on the user corresponding to the terminal is stored in the registered terminal memory unit 141 (step S20). That is, the registration terminal determination unit 132 determines whether the terminal AT in communication with the macrocell AN is a registered terminal. If it is determined that the terminal AT in communication with the macrocell AN is the registered terminal, the control unit 110 stores the ESN of the terminal in the pilot beacon transmission factor memory unit 144 (step S22). Next, the pilot beacon transmission control unit 112 controls the pilot beacon transmission unit 122 to start transmission of the pilot beacon (step S23). In addition, the control unit 110 sets a timer to stop transmission of the pilot beacon after a certain period of time (a detailed description thereof will be presented below) (step S24). The processing proceeds to step S21 to continue processing of the loop 1 in the following cases: if it is determined that the received power of the radio wave received by the uplink communication radio wave reception unit 124 is lower than the threshold at step S14; if it is determined that decoding of the uplink communication fails at step S16; if extraction of the UATI fails at step S18; and if it is determined that the terminal AT in communication with the macrocell AN is not the registered terminal at step S20.

Figure 4:
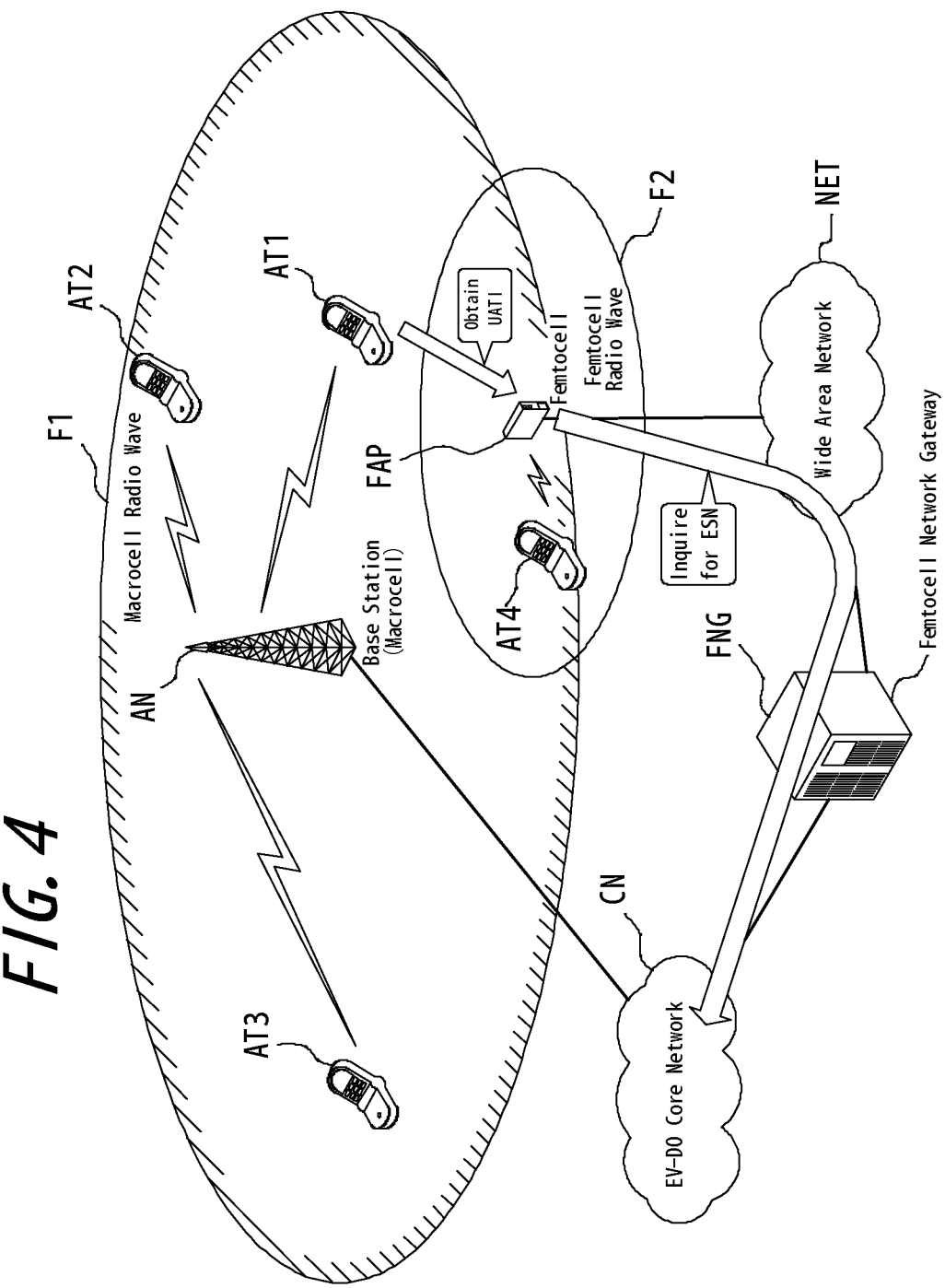
FIG. 4 is a schematic diagram illustrating a state that the femtocell FAP starts transmission of the pilot beacon.
Figure 5:
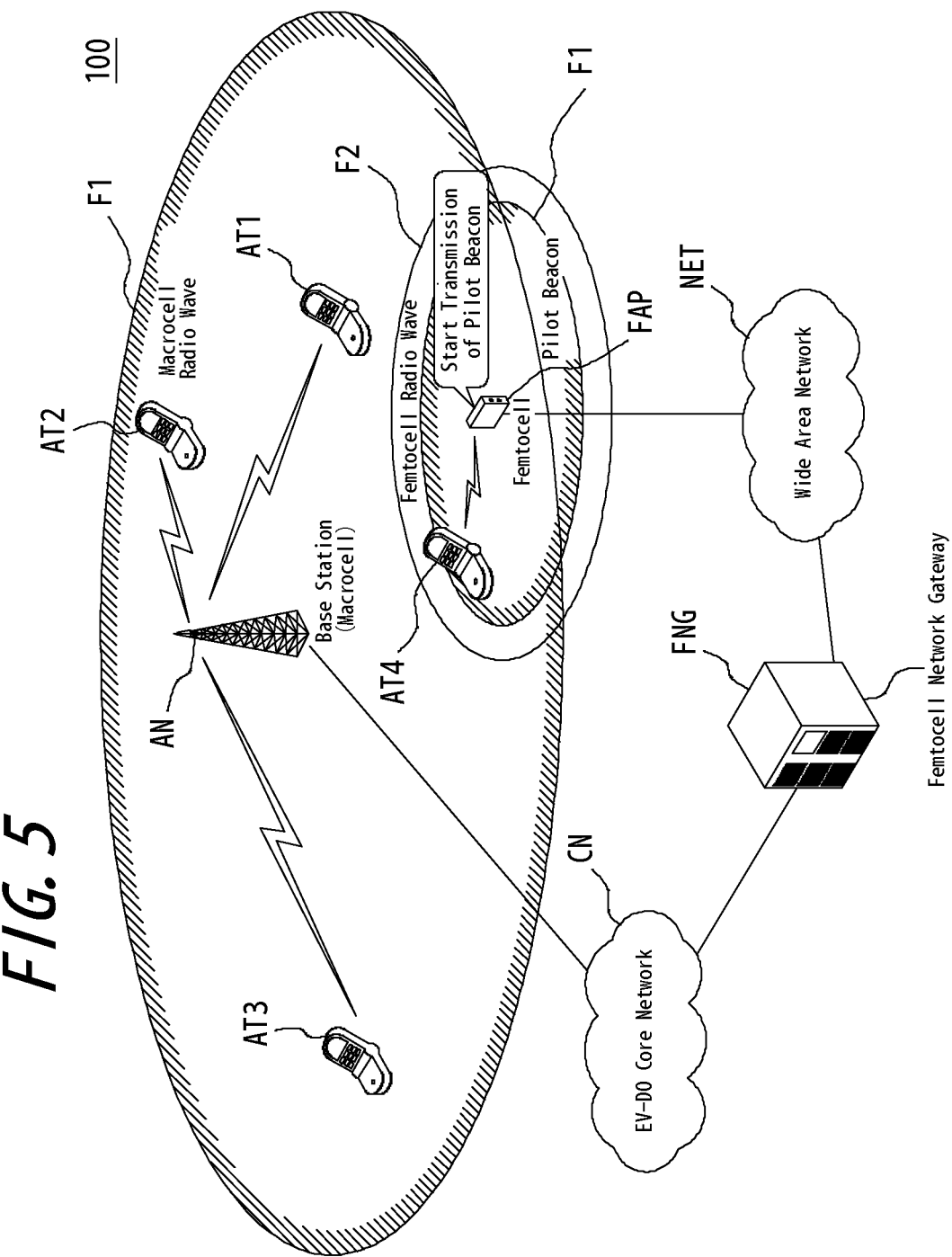
FIG. 5 is a schematic diagram illustrating another state that the femtocell FAP starts transmission of the pilot beacon.

A flow of the processing in the flowchart in FIG. 3 is described with reference to FIG. 1, FIG. 4 and FIG. 5. FIG. 4 and FIG. 5 are schematic diagrams illustrating a state that the femtocell FAP starts transmission of the pilot beacon. As shown in FIG. 1, first, the terminals AT1-AT3 are location-registered (sessions established) with the macrocell AN, whereas the terminal AT4 is location-registered with the femtocell FAP. The terminal AT1 is a registered terminal of the femtocell FAP in FIG. 1, FIG. 4 and FIG. 5. As shown in FIG. 1, the femtocell FAP detects the radio waves of the uplink communications between the terminals AT1-AT3 and the macrocell AN, and determines the received power thereof. In a case shown in FIG. 1, the radio wave received from the terminal AT1 is equal to or higher than the threshold and thus it is determined that the terminal AT1 is close to the area of the femtocell FAP. As shown in FIG. 4, therefore, the femtocell FAP extracts the UATI assigned to the communication between the macrocell AN and the terminal AT1 and inquires of the EV-DO core network CN for the ESN corresponding to the UATI. Since the terminal AT1 is the registered terminal of the femtocell FAP, the ESN obtained from the EV-DO core network CN corresponds to the information stored in the registered terminal memory unit 141. Accordingly, in order to attract the terminal AT1 (to handoff), the femtocell FAP starts transmission of the pilot beacon, as shown in FIG. 5.

Figure 6:
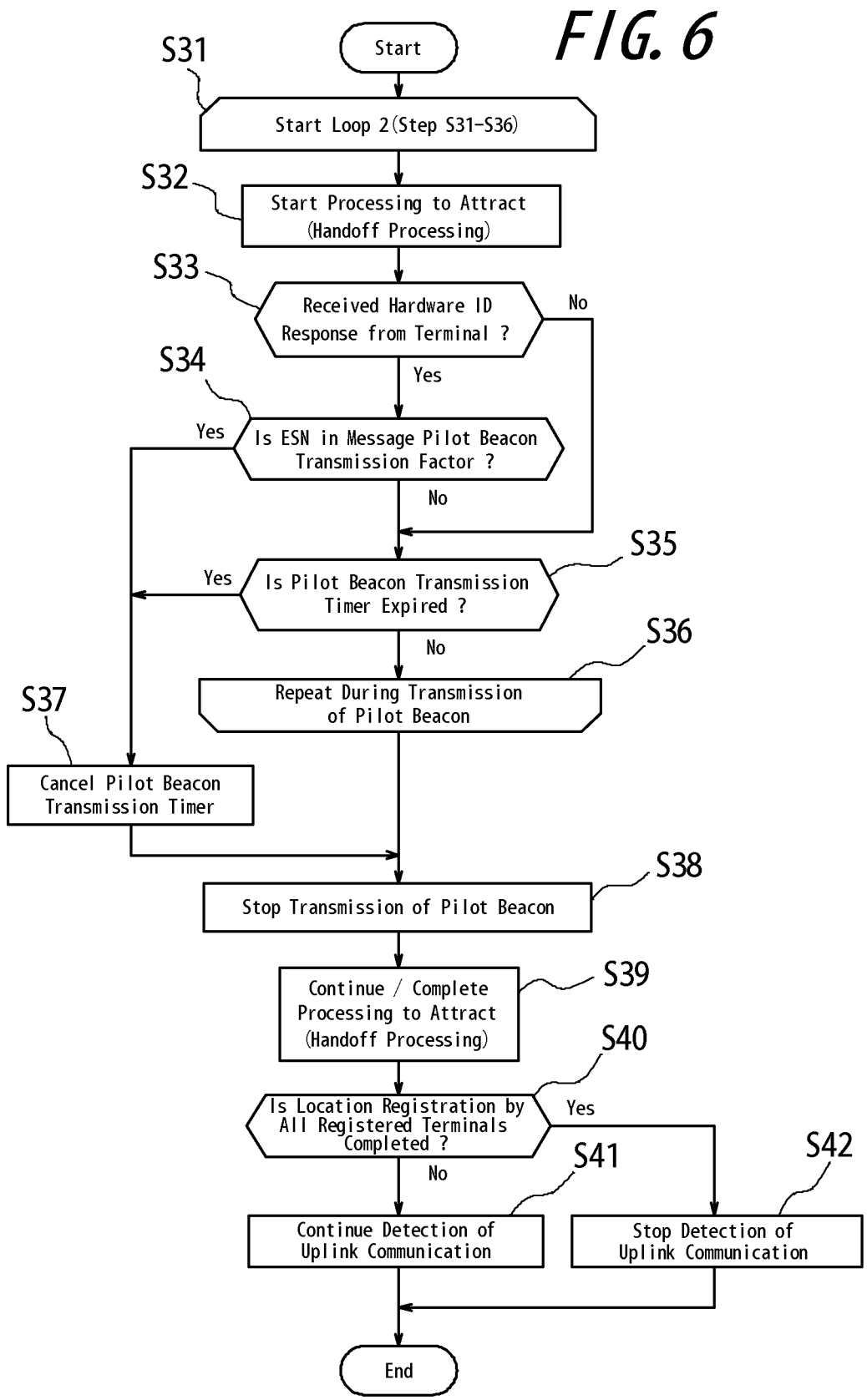
FIG. 6 is a flowchart of exemplary processing to stop transmission of the pilot beacon by the femtocell FAP.

Next, processing to stop transmission of the pilot beacon by the femtocell FAP will be described. The femtocell FAP repeats transmission and suspension of the pilot beacon for attracting a registered terminal from the macrocell AN until all of the registered terminals performs location-registration, that is, until they establish sessions of idle, connection or the like. In doing so, as described above, the femtocell FAP starts transmission of the pilot beacon if a registered terminal is in or close to its area, and stops transmission of the pilot beacon if the registered terminal performs handoff to the femtocell FAP. Then, if all of the registered terminals of the femtocell FAP are location-registered with the femtocell FAP (sessions established), the femtocell FAP stops detecting (monitoring) the communication between the macrocell AN and the terminals FIG. 6 is a flowchart of processing to stop transmission of the pilot beacon by the femtocell FAP described above. As shown in the flowchart, the femtocell FAP repeats processing in a loop 2 (steps S31-S36) while transmitting the pilot beacon. First, the femtocell FAP starts processing to attract the terminal AT to handoff thereto (handoff processing) while transmitting the pilot beacon (step S32).

Figure 7:
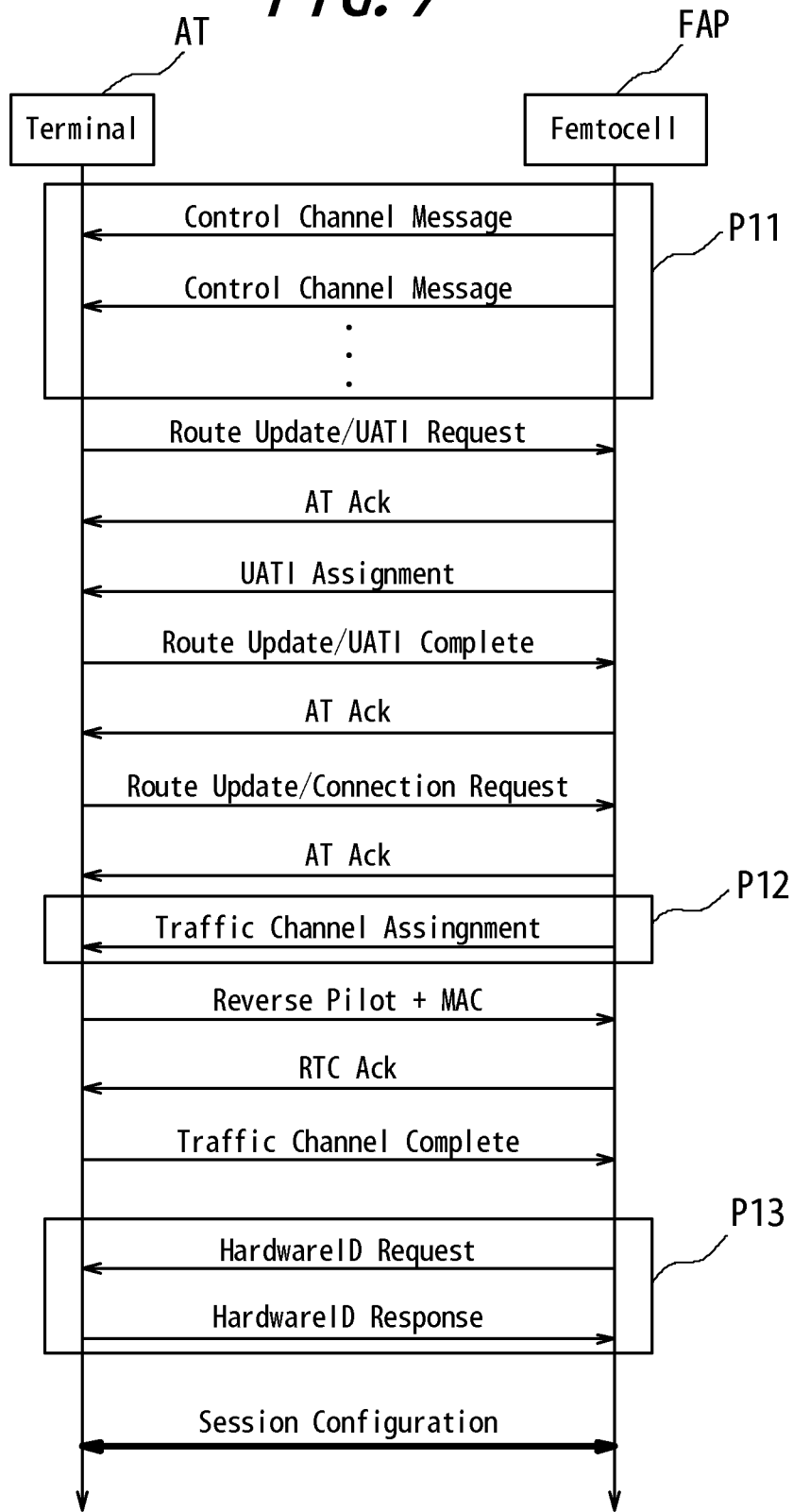
FIG. 7 is a sequence diagram illustrating communications between a terminal AT and the femtocell FAP to attract the terminal AT to the femtocell FAP.

Here, the processing to attract will be described briefly. FIG. 7 is a sequence diagram illustrating communications between the terminal AT and the femtocell FAP when the femtocell FAP attracts the terminal AT (to handoff). The terminal AT starts the handoff processing to the femtocell FAP by establishing a session with the femtocell FAP. The femtocell FAP transmits Control Channel Message to the terminal AT via the radio communication unit 120 (step P11). The Control Channel Message is a message for the base station to control mobile stations in the idle state and includes the frequency and the like of the base station, for example. The femtocell FAP may be configured such that the terminal AT detects the femtocell FAP after it makes the terminal AT lose the macrocell AN by using the pilot beacon with the same frequency as the macrocell AN. Alternatively, the femtocell FAP may shift the terminal AT to a channel of the femtocell FAP by performing redirection before start of the handoff processing. It is also possible that the femtocell FAP shifts the terminal AT to the channel of the femtocell FAP by transmitting Traffic Channel Assignment to the terminal AT (step P12).

If the handoff processing is started, the femtocell FAP transmits Hardware ID Request to the terminal AT and receives Hardware ID Response as a response from the terminal AT (step P13). The Hardware ID is an identifier unique to the terminal and includes the ESN, MEID (Mobile Equipment Identifier) or the like. The processing at step P13 is performed by the femtocell FAP in attracting the terminal AT by any method described above. This step corresponds to step S33 in the flowchart of the processing to stop transmission of the pilot beacon in FIG. 6. That is, the determination unit 130 determines whether the Hardware ID Response is received from the terminal AT at step S33. If the determination unit 130 determines that the Hardware ID Response is received, the pilot beacon transmission factor determination unit 136 determines whether the ESN included in the Hardware ID Response corresponds to the ESN stored as a pilot beacon transmission factor in the pilot beacon transmission factor memory unit 144 (step S34). As described with reference to the flowchart in FIG. 3, the pilot beacon transmission factor refers to a terminal which was a factor causing transmission of the pilot beacon, stored in the pilot beacon transmission factor memory unit 144 when the femtocell FAP starts transmission of the pilot beacon (step S22 of FIG. 3).

If the pilot beacon transmission factor determination unit 136 determines that the ESN included in the Hardware ID Response corresponds to the ESN registered as the pilot beacon transmission factor at step S34, the pilot beacon transmission control unit 112 controls the pilot beacon transmission unit 122 to stop transmission of the pilot beacon (step S38). In so doing, the control unit 110 cancels a pilot beacon transmission timer (step S37).

Here, the pilot beacon transmission timer will be described. It is considered that, for example, the terminal which was a factor causing transmission of the pilot beacon may move away from the area of the femtocell FAP or be turned off. In such cases unable to complete handoff to the femtocell FAP, it is not desirable to continue transmission of the pilot beacon. Accordingly, the control unit 110 determines whether the pilot beacon transmission timer is expired in the loop 2 (step S35). The pilot beacon transmission timer has been set when transmission of the pilot beacon was started at step S24 in FIG. 3. Thereby, it is possible to stop transmission of the pilot beacon if the terminal which was a factor causing transmission of the pilot beacon cannot handoff for any reason as well, and thus to prevent interference with the macrocell AN.

If the pilot beacon transmission factor determination unit 136 determines that the ESN included in the Hardware ID Response does not correspond to the ESN registered as the pilot beacon transmission factor at step S34, it means that the terminal corresponding to the ESN is another terminal which moves into the area of the femtocell FAP when the femtocell FAP is transmitting the pilot beacon. That is, the "another terminal" is a terminal different from the terminal which was a factor causing transmission of the pilot beacon by the femtocell FAP. Accordingly, the femtocell FAP continues to transmit the pilot beacon (step S36). That is, the femtocell FAP does not stop transmission of the pilot beacon unless the handoff processing of the terminal which was a factor causing transmission of the pilot beacon is performed or unless the pilot beacon transmission timer is expired. Thereby, even if a plurality of registered terminals move into the area of the femtocell FAP from the area of the macrocell AN, it is possible to assure handoff of each of the terminals to the femtocell FAP.

After stopping transmission of the pilot beacon at step S38, the femtocell FAP continues the processing to attract the terminal AT (step S39). Then, predetermined processing is performed between the terminal AT and the femtocell FAP until a session is established therebetween (Session Configuration in FIG. 7) in conformity with a protocol of EV-DO. The femtocell FAP stores the UATI assigned to the terminal which was a factor causing transmission of the pilot beacon in the connected terminal UATI memory unit 143.

When the handoff processing of the terminal which was a factor causing transmission of the pilot beacon is completed at step S39, the connected terminal determination unit 134 determines whether all of the registered terminals are location-registered (they have established a session of idle, connection or the like) with the femtocell FAP (step S40). This determination is made based on whether the number of registered terminals stored in the memory unit 140 matches the number of UATIs stored in the connected terminal UATI memory unit 143. If it is determined that not all of the registered terminals are location-registered with the femtocell FAP yet at step S40, the uplink communication detection/determination unit 114 controls the uplink communication radio wave reception unit 124 to continue to receive the uplink communication radio waves (step S41). If it is determined that all of the registered terminals are location-registered with the femtocell FAP at step S40, the uplink communication detection/determination unit 114 controls the uplink communication radio wave reception unit 124 to stop receiving the uplink communication radio wave (step S42).

The femtocell FAP may need to resume detection of the uplink communication radio wave to lead a registered terminal to perform handoff thereto even if detection (monitoring) of the uplink communication is stopped at step S42. For example, the femtocell FAP should resume monitoring of the uplink communication if the registered terminal which has established a session with the femtocell FAP establishes a session with the macrocell AN. To that end, it is necessary to inform the femtocell FAP that the registered terminal performs handoff and establishes a session with the macrocell AN. As a method for it, it is possible, for example, to notify the femtocell FAP from the registered terminal which performs handoff or the EV-DO core network CN. Alternatively, the femtocell FAP may periodically check idle terminals therein by using a keep alive function.

Figure 8:
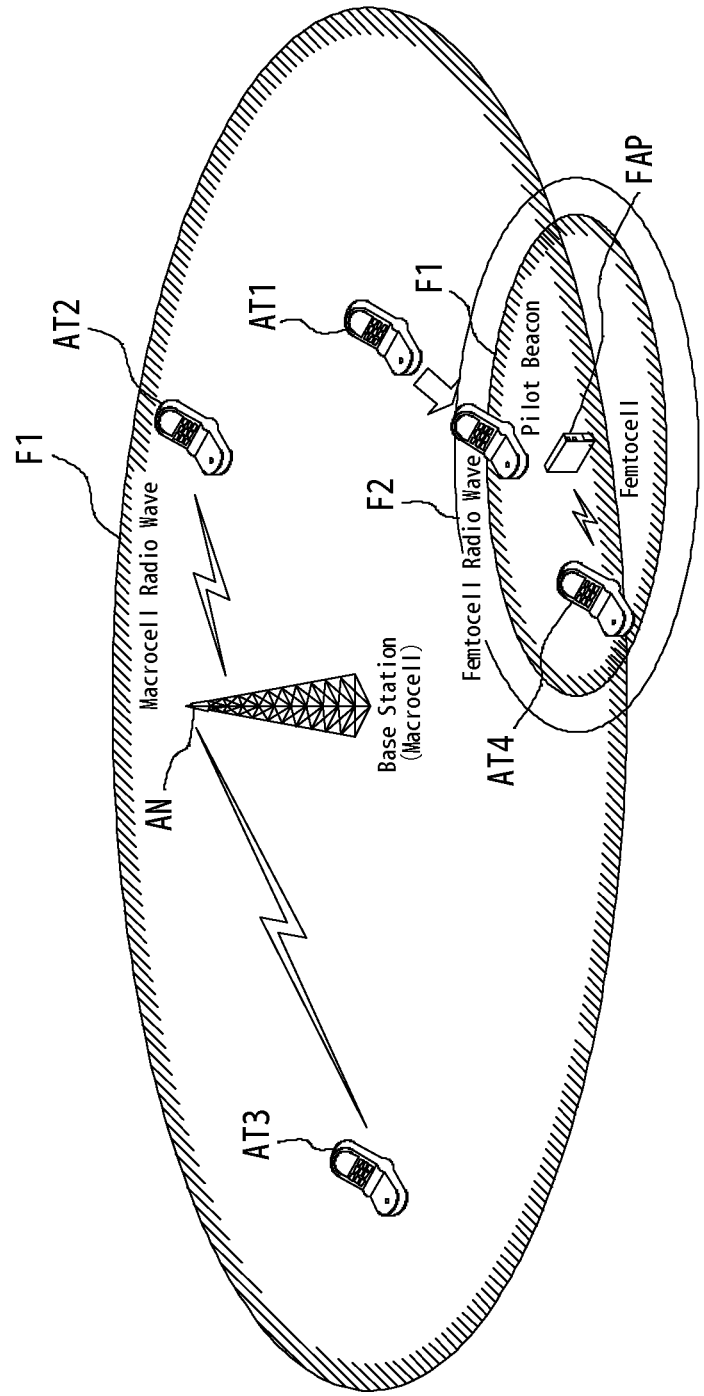
FIG. 8 is a diagram illustrating a state that the femtocell FAP is transmitting the pilot beacon.
Figure 9:
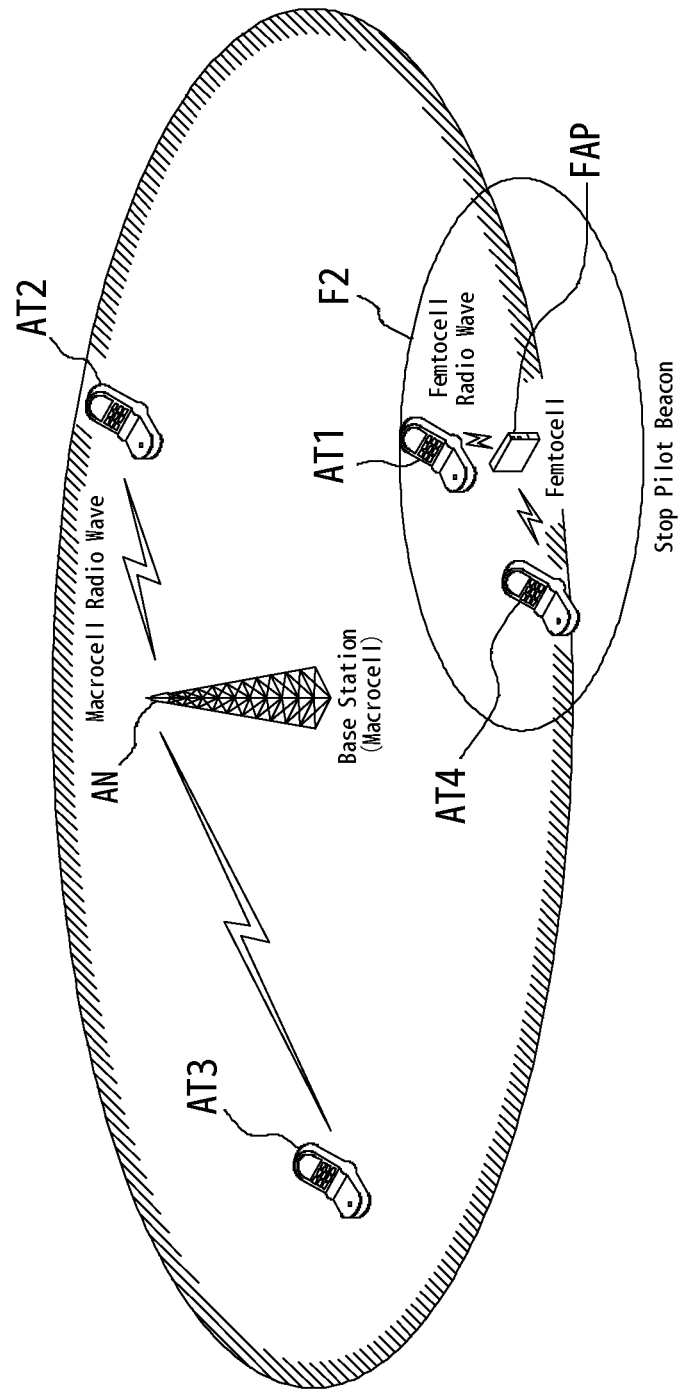
FIG. 9 is a diagram illustrating a state that the femtocell FAP is suspending transmission of the pilot beacon.

Here, the above processing to stop transmission of the pilot beacon by the femtocell FAP is described with reference to schematic diagrams. FIG. 8 and FIG. 9 are schematic diagrams illustrating the above processing in the mobile communication system 100.

FIG. 8 is a diagram illustrating a state that the femtocell FAP is transmitting the pilot beacon to lead the registered terminal AT1, which is approaching to the service area of the femtocell FAP, to perform handoff. After starting the handoff processing, the femtocell FAP receives the Hardware ID Response from the registered terminal AT1. Then, as shown in FIG. 9, the femtocell FAP stops transmission of the pilot beacon.

According to the present invention, as described above, it is determined that a registered terminal allowed to use the femtocell FAP is approaching to the area thereof based on the intensity of radio waves between the registered terminal and the macrocell. And, transmission of the pilot beacon is started only when the registered terminal approaches, and the transmission of the pilot beacon is stopped when the registered terminal performs handoff and establishes a session with the femtocell FAP. Thereby, it is possible to prevent interference with the macrocell as much as possible. In addition, transmission of the pilot beacon is stopped when the registered terminal which was a factor causing transmission of the pilot beacon performs handoff, and transmission and suspension of the pilot beacon is controlled for each of the registered terminals to perform handoff. Thereby, it is possible to ensure handoff of each of the registered terminals. Moreover, it is possible to significantly reduce power consumption of the femtocell without wasting power, not only because an unnecessary pilot beacon is not transmitted but also because reception of the radio wave between the macrocell and the terminal is stopped when all of the registered terminals establish sessions with the femtocell FAP.

Although the ESN is used as the terminal identifier in the above embodiment, any identifier other than ESN may be used so long as it can be obtained from the network by the femtocell. The terminal identifier may be information on the user corresponding to the mobile terminal, such as the subscriber information or the like, for example. In addition, although the ESN of the terminal is obtained from the EV-DO core network CN in the above embodiment, the present invention is not limited thereto. For example, the femtocell FAP itself may inquire of the terminal for the identifier by transmitting the Hardware ID Request directly to the terminal.

Moreover, although it is assumed to use CDMA2000 1xEV-DO as the mobile communication system in the above embodiment, the present invention is not limited thereto but applicable also to a system such as W-CDMA scheme (HSDPA or the like), LTE (Long Term Evolution) and UMB (Ultra Mobile Broadband), for example. In such a case, location registration (session establishment) to the femtocell FAP and the macrocell AN is performed not by assigning the UATI as described above but by a method in accordance with each of the schemes.

While the present invention is described based on the drawings and the embodiments, it should be noted that those skilled in the art can easily vary or modify in a multiple manner based on disclosure of the present invention. Hence, such variation and modification are intended to be included in the scope of the present invention. For example, each function and the like included in a unit, a step and the like can be rearranged avoiding a logical inconsistency and a plurality of components or steps can be combined to one or divided. For example, although the radio wave of the uplink communication is received to perform handoff in the above embodiment, the present invention is not limited thereto. It is also possible, for example, to detect radio waves periodically transmitted to the macrocell from the terminal in the idle state and perform the above processing based on the power intensity thereof. Such a case enables idle handoff. It is appreciated that not only the pilot beacon but also any signals to allow the terminal (mobile terminal) to detect the base station of the present invention may be included in the scope of the present invention.

INDUSTRIAL APPLICABILITY

According to the present invention, a base station transmits the pilot beacon only if a registered terminal is in or close to its communication area and stops transmission of the pilot beacon in other states or in a case that all of the registered terminals are in the idle state, so that it is possible to avoid interfering with a macrocell.

REFERENCE SIGNS LIST 100 mobile communication system
110 control unit
112 pilot beacon transmission control unit
114 communication detection/determination unit
116 communication decoding unit
118 terminal information obtaining unit
120 radio communication unit
122 pilot beacon transmission unit
124 communication radio wave reception unit
126 terminal transmission and reception unit
130 determination unit
132 registered terminal determination unit
134 connected terminal determination unit
136 pilot beacon transmission factor determination unit
140 memory unit
141 registered terminal memory unit
142 peripheral base station information memory unit
143 connected terminal UATI memory unit
144 pilot beacon transmission factor memory unit
145 threshold memory unit
150 wired communication unit
ANT antenna
AT1-AT4 terminal (mobile terminal)
AN macrocell (wide area base station)
CN EV-DO core network
FNG femtocell network gateway
NET wide area network
FAP femtocell
F1 macrocell radio wave, pilot beacon
F2 femtocell radio wave

The invention claimed is:

1. A base station of a mobile communication system comprising:
    means for transmitting a pilot beacon to allow a mobile terminal to detect the base station;
    means for registering information on a mobile terminal to use the base station or information on a user corresponding to a mobile terminal to use the base station;
    means for controlling the transmission unit to stop transmission of the pilot beacon if a mobile terminal corresponding to the information registered with the registration unit performs handoff to the base station;
    means for receiving a radio wave transmitted to another base station from a mobile terminal location-registered with the another base station of the mobile communication system; and
    means for obtaining information on a mobile terminal location-registered with the another base station or information on a user corresponding to the mobile terminal from a mobile communication network to which the another base station is connected, wherein
    the means for controlling controls the means for obtaining information to obtain information on a mobile terminal having an intensity of a radio wave received by the means for receiving a radio wave equal to or higher than a threshold or information on the user corresponding to the mobile terminal based on an identifier included in the radio wave having the intensity equal to or higher than the threshold while transmission of the pilot beacon is stopped, and if the mobile terminal corresponding to the obtained information is registered with the means for registering information, the means for controlling controls the means for transmitting a pilot beacon to resume transmission of the pilot beacon, and
    the means for controlling controls the means for receiving to stop reception of the radio wave if all mobile terminals registered with the means for registering information are location-registered with the base station based on information on the mobile terminals location-registered with the base station or information on users corresponding to the mobile terminals, and also based on information on the mobile terminals registered with the means for registering information or information on users corresponding to the mobile terminals.

2. A control method of a base station of a mobile communication system comprising the steps of:

transmitting a pilot beacon to allow a mobile terminal to detect the base station;

registering information on a mobile terminal to use the base station or information on a user corresponding to a mobile terminal to use the base station;

stopping transmission of the pilot beacon if a mobile terminal corresponding to the information registered at the step of registering performs handoff to the base station;

receiving a radio wave transmitted to another base station from a mobile terminal location-registered with the another base station of the mobile communication system;

while transmission of the pilot beacon is stopped, obtaining information on the mobile terminal location-registered with the another base station if an intensity of the received radio wave associated with the mobile terminal is equal to or higher than a threshold or obtaining information on a user corresponding to the mobile terminal from a mobile communication network to which the another base station is connected based on an identifier included in the received radio wave if an intensity of the received radio wave is equal to or higher than the threshold;

if the obtained information corresponds to the registered information, resuming transmission of the pilot beacon; and if all mobile terminals registered with the registration unit are location-registered with the base station based on information on the mobile terminals location-registered with the base station or information on users corresponding to the mobile terminals, and also based on information on the mobile terminals registered with the registration unit or information on users corresponding to the mobile terminals, stopping reception of the radio wave.

3. A base station of a mobile communication system comprising:

a transmission unit configured to transmit a pilot beacon to allow a mobile terminal to detect the base station;

a registration unit configured to register information on a mobile terminal to use the base station or information on a user corresponding to the mobile terminal to use the base station;

a control unit configured to control the transmission unit to stop transmission of the pilot beacon if a mobile terminal corresponding to the information registered with the registration unit performs handoff to the base station;

a reception unit configured to receive a radio wave transmitted to another base station from a mobile terminal location-registered with the another base station of the mobile communication system; and an obtaining unit configured to obtain information on a mobile terminal location-registered with the another base station or information on a user corresponding to the mobile terminal from a mobile communication network to which the another base station is connected, wherein the control unit is configured to control the obtaining unit to obtain information on a mobile terminal having an intensity of a radio wave received by the reception unit equal to or higher than a threshold or information on a user corresponding to the mobile terminal based on an identifier included in the radio wave having the intensity equal to or higher than the threshold while transmission of the pilot beacon is stopped, and if the mobile terminal corresponding to the obtained information is registered with the registration unit, the control unit is configured to control the transmission unit to resume transmission of the pilot beacon, and the control unit is configured to control the reception unit to stop reception of the radio wave if all mobile terminals registered with the registration unit are location-registered with the base station based on information on the mobile terminals location-registered with the base station or information on users corresponding to the mobile terminals, and also based on information on the mobile terminals registered with the registration unit or information on users corresponding to the mobile terminals.

* * * * *